(12) United States Patent
Baek

(10) Patent No.: US 9,821,770 B2
(45) Date of Patent: Nov. 21, 2017

(54) WINDOWPANE DEFOGGING DEVICE FOR A MOTOR VEHICLE AND WINDOWPANE DEFOGGING METHOD USING THE SAME

(71) Applicant: Halla Visteon Climate Control Corp., Daedeok-gu, Daejeon (KR)

(72) Inventor: Chang Hyun Baek, Daejeon (KR)

(73) Assignee: Hanon Systems, Daedeok-gu, Daejeon (KR)

( * ) Notice: Subject to any disclaimer, the term of this patent is extended or adjusted under 35 U.S.C. 154(b) by 472 days.

(21) Appl. No.: 14/371,169

(22) PCT Filed: Oct. 29, 2013

(86) PCT No.: PCT/KR2013/009650
§ 371 (c)(1),
(2) Date: Jul. 8, 2014

(87) PCT Pub. No.: WO2014/069860
PCT Pub. Date: May 8, 2014

(65) Prior Publication Data
US 2015/0017900 A1    Jan. 15, 2015

(30) Foreign Application Priority Data

Oct. 30, 2012    (KR) .................. 10-2012-0121196

(51) Int. Cl.
*B60S 1/02*      (2006.01)
*B60H 1/00*      (2006.01)
(Continued)

(52) U.S. Cl.
CPC .......... *B60S 1/023* (2013.01); *B60H 1/00742* (2013.01); *B60H 1/00785* (2013.01);
(Continued)

(58) Field of Classification Search
CPC ............. B60H 1/00742; B60H 1/00785; G01J 2005/0077; G01J 5/34; B60S 1/54; B60S 1/023

See application file for complete search history.

(56) References Cited

U.S. PATENT DOCUMENTS

| | | | | |
|---|---|---|---|---|
| 4,583,815 A | * | 4/1986 | Taga | ................. B32B 17/10036 |
| | | | | 219/203 |
| 5,496,989 A | * | 3/1996 | Bradford | ................. B60S 1/026 |
| | | | | 219/482 |

(Continued)

FOREIGN PATENT DOCUMENTS

| JP | 2011093533 A | 5/2011 |
|---|---|---|
| KR | 10-2009-0072613 A | 7/2009 |
| KR | 20100005925 | * 1/2010 |

OTHER PUBLICATIONS

PCT/KR13/09650 International Search Report, dated Feb. 11, 2014.

*Primary Examiner* — Steven B McAllister
*Assistant Examiner* — Steven Anderson, II
(74) *Attorney, Agent, or Firm* — Patent Law Group LLP; David C. Hsia

(57) ABSTRACT

The present invention provides a windowpane defogging device for a motor vehicle which, upon generation of a fog on a windowpane, comes into a defogging mode to remove the fog generated on the windowpane. The windowpane defogging device includes a relative humidity detecting unit configured to detect a windowpane relative humidity of a driver seat view field region of the windowpane and a windowpane relative humidity of a passenger seat view field region of the windowpane, and a control unit configured to control entry into the defogging mode by determining the generation or non-generation of the fog on the windowpane based on the windowpane relative humidity of the driver seat view field region and the windowpane relative humidity (Continued)

of the passenger seat view field region inputted from the relative humidity detecting unit.

5 Claims, 9 Drawing Sheets

(51) Int. Cl.
    *B60S 1/54*     (2006.01)
    *G01J 5/34*     (2006.01)
    *G01J 5/00*     (2006.01)

(52) U.S. Cl.
    CPC . *B60S 1/54* (2013.01); *G01J 5/34* (2013.01); *G01J 2005/0077* (2013.01)

(56) References Cited

U.S. PATENT DOCUMENTS

| | | | |
|---|---|---|---|
| 5,701,752 A * | 12/1997 | Tsunokawa | B60H 1/00785 165/204 |
| 2003/0211820 A1 | 11/2003 | Tsuji et al. | |
| 2004/0103675 A1 * | 6/2004 | Tomita | B60H 1/00735 62/157 |
| 2004/0144911 A1 * | 7/2004 | Stam | B60Q 1/143 250/208.1 |
| 2006/0207325 A1 * | 9/2006 | Kataoka | G01N 21/4738 73/335.01 |
| 2006/0284839 A1 * | 12/2006 | Breed | B62D 1/046 345/156 |
| 2006/0289458 A1 * | 12/2006 | Kim | B60H 1/00785 219/497 |
| 2007/0235549 A1 * | 10/2007 | Nakajima | B60H 1/00864 236/44 R |
| 2007/0251251 A1 * | 11/2007 | Wojdyla | B60H 1/321 62/180 |
| 2008/0121034 A1 | 5/2008 | Lynam et al. | |
| 2010/0274396 A1 * | 10/2010 | Yang | B60H 1/00385 700/278 |
| 2012/0142264 A1 * | 6/2012 | Sagou | B60H 1/00735 454/75 |
| 2013/0024169 A1 * | 1/2013 | Veerasamy | B32B 17/10036 703/2 |
| 2013/0025310 A1 * | 1/2013 | Itoh | B60H 1/00064 62/186 |

* cited by examiner

WINDOWPANE DEFOGGING DEVICE FOR A MOTOR VEHICLE AND WINDOWPANE DEFOGGING METHOD USING THE SAME

The present application is a 371 application of International Application No. PCT/KR2013/009650 filed on Oct. 29, 2013 and entitled "Windowpane Defogging Device for a Motor Vehicle and Windowpane Defogging Method Using the Same," which claims the benefit of Korean Patent Application No. 10-2012-0121196 filed on Oct. 30, 2012.

TECHNICAL FIELD

The present invention relates to a windowpane defogging device for a motor vehicle and a windowpane defogging method using the same. More particularly, the present invention pertains to a windowpane defogging device for a motor vehicle which is configured to determine the generation or non-generation of a fog in a driver's view field region of a windowpane and to accurately control the operation or non-operation of the defogging device and the operation start time thereof based on the determination result, thereby preventing an unnecessary operation of the defogging device and a resultant unnecessary consumption of energy and consequently improving the fuel efficiency of a motor vehicle, and a windowpane defogging method using the windowpane defogging device.

BACKGROUND ART

In recent years, an automatic-control-type air conditioning system is widely used in motor vehicles. The automatic-control-type air conditioning system detects a vehicle indoor temperature, a vehicle outdoor temperature, a vehicle indoor humidity, a vehicle outdoor humidity, a solar radiation amount and so forth. Using the detection data thus obtained, the air conditioning system automatically controls a vehicle indoor temperature, thereby keeping a vehicle indoor environment pleasant at all times.

The automatic-control-type air conditioning system includes a defogging device that, when a fog is generated on a windowpane of a motor vehicle, automatically removes the fog adhering to the windowpane.

As shown in FIG. 1, the defogging device includes a defog sensor 1 for sensing a windowpane relative humidity and a control unit 9 for controlling a defrost door 3, an intake door 5, a air conditioner compressor 7 and a blower 8 depending on the windowpane relative humidity inputted from the defog sensor 1.

The defog sensor 1 includes a temperature sensing unit 1a for sensing a windowpane temperature, a humidity sensing unit 1b for sensing a windowpane humidity, and a microcomputer 1c for calculating a windowpane relative humidity by processing the windowpane temperature sensed by the temperature sensing unit 1a and the windowpane humidity sensed by the humidity sensing unit 1b.

As illustrated in FIG. 2, the defog sensor 1 is arranged within a vehicle room and is attached to an upper central portion of a windowpane G. The defog sensor 1 thus attached makes physical contact with the upper central portion of the windowpane G to sense a humidity and a temperature of the windowpane G. By processing the humidity and the temperature thus sensed, the defog sensor 1 calculates a relative humidity of the windowpane G.

If the windowpane relative humidity inputted from the defog sensor 1 is equal to or higher than a reference humidity, the control unit 9 determines that a fog has been generated on the windowpane. Based on this determination, the control unit 9 comes into a defogging mode in which the defrost door 3 is opened at a predetermined opening degree, the intake door 5 is converted to an outdoor air mode, and the compressor 7 and the blower 9 are operated.

As a result, a fresh external air is cooled into a cold air while passing through an evaporator 7a. The cold air is discharged toward the windowpane through a defrost vent 3a. The cold air thus discharged can remove a fog adhering to the windowpane.

In the conventional defogging device mentioned above, the defog sensor 1 is installed in the upper central portion of the windowpane G. This poses a shortcoming in that the defog sensor 1 can merely sense only the relative humidity in the upper central portion of the windowpane G which does not assist in securing a driver's view field.

Due to this shortcoming, there is a problem in that the generation or non-generation of a fog in the windowpane G has to be determined by relying on the windowpane portion which does not assist in securing a driver's view field.

Accordingly, the defogging device is unnecessarily operated even when a fog is generated only in the windowpane portion which does not assist in securing a driver's view field. This leads to unnecessary energy consumption, as a result of which the fuel efficiency of a motor vehicle is reduced.

SUMMARY OF THE INVENTION

Technical Problems

In view of the problems noted above, it is an object of the present invention to provide a windowpane defogging device which is configured to sense a windowpane relative humidity in a driver's view field region of a windowpane and which is capable of accurately determining the generation or non-generation of a fog in the driver's view field region of the windowpane, and a windowpane defogging method using the windowpane defogging device.

Another object of the present invention is to provide a windowpane defogging device which is configured to accurately control the operation or non-operation of the defogging device and the operation start time thereof and which is capable of preventing the defogging device from being unnecessarily operated despite the non-generation of a fog in a driver's view field region, and a windowpane defogging method using the windowpane defogging device.

A further object of the present invention is to provide a windowpane defogging device which is configured to prevent the defogging device from being unnecessarily operated despite the non-generation of a fog in a driver's view field region and which is capable of preventing unnecessary energy consumption, improving the fuel efficiency of a motor vehicle and efficiently removing a fog generated on a windowpane, and a windowpane defogging method using the windowpane defogging device.

Means for Solving the Problems

In order to achieve the above objects, the present invention provides a windowpane defogging device for a motor vehicle which, upon generation of a fog on a windowpane, comes into a defogging mode to remove the fog generated on the windowpane, including: a relative humidity detecting unit configured to detect a windowpane relative humidity of a driver seat view field region of the windowpane and a windowpane relative humidity of a passenger seat view field region of the windowpane; and a control unit configured to control entry into the defogging mode by determining the generation or non-generation of the fog on the windowpane based on the windowpane relative humidity of the driver seat view field region and the windowpane relative humidity of the passenger seat view field region inputted from the relative humidity detecting unit.

Preferably, when only one of a driver seat and a passenger seat is taken by a user, the control unit is configured to determine the generation or non-generation of the fog on the windowpane based on only the windowpane relative humidity of the driver seat view field region or the passenger seat view field region corresponding to the driver seat or the passenger seat taken by the user, while excluding the windowpane relative humidity of the driver seat view field region or the passenger seat view field region corresponding to the driver seat or the passenger seat not taken by the user.

The present invention further provides a windowpane defogging method which, upon generation of a fog on a windowpane, comes into a defogging mode to remove the fog generated on the windowpane, including: a) a step of detecting a windowpane temperature of a driver seat view field region of the windowpane, a windowpane temperature of a passenger seat view field region of the windowpane and a humidity of the windowpane; b) a step of calculating a windowpane relative humidity of the driver seat view field region and a windowpane relative humidity of the passenger seat view field region by processing the windowpane temperature of the driver seat view field region, the windowpane temperature of the passenger seat view field region and the humidity of the windowpane; c) a step of determining whether at least one of the windowpane relative humidity of the driver seat view field region and the windowpane relative humidity of the passenger seat view field region is equal to or higher than a predetermined reference humidity; and d) a step of, if at least one of the windowpane relative humidity of the driver seat view field region and the windowpane relative humidity of the passenger seat view field region is equal to or higher than the predetermined reference humidity, determining that the fog is generated on the windowpane and coming into the defogging mode.

Preferably, the step c) includes: c-1) a step of determining whether a driver seat or a passenger seat is taken by a user; and c-2) a step of determining whether the windowpane relative humidity of the driver seat view field region or the passenger seat view field region corresponding to the driver seat or the passenger seat taken by the user is equal to or higher than the reference humidity, while excluding the windowpane relative humidity of the driver seat view field region or the passenger seat view field region corresponding to the driver seat or the passenger seat not taken by the user.

Advantageous Effects

According to the windowpane defogging device of the present invention and the windowpane defogging method using the windowpane defogging device, the windowpane relative humidity is calculated using the temperature measured in the entire driver's view field region. It is therefore possible to accurately determine the generation or non-generation of a fog in the driver's view field region of the windowpane.

Since the windowpane defogging device is configured to accurately determine the generation or non-generation of a fog in the driver's view field region of the windowpane, it is possible to accurately control the operation or non-operation of the defogging device and the operation start time thereof.

Inasmuch as the windowpane defogging device is configured to accurately control the operation or non-operation of the defogging device and the operation start time thereof, it is possible to prevent the defogging device from being unnecessarily operated despite the non-generation of a fog in the driver's view field region.

Seeing that the windowpane defogging device is configured to prevent the defogging device from being unnecessarily operated despite the non-generation of a fog in the driver's view field region, it is possible to prevent unnecessary energy consumption and to improve the fuel efficiency of a motor vehicle.

In addition, the windowpane defogging device is configured to determine the generation or non-generation of a fog on the windowpane based on only the windowpane relative humidity of the view field region corresponding to the driver seat or the passenger seat taken by the user. It is therefore possible to accurately control the operation or non-operation of the defogging device by relying on only the relative humidity of the windowpane portion which assists in securing the user's view field.

Since the windowpane defogging device is configured to accurately control the operation or non-operation of the defogging device by relying on only the relative humidity of the windowpane portion which assists in securing the user's view field, it is possible to prevent the defogging device from being unnecessarily operated due to the generation of a fog in the windowpane portion which does not assist in securing the user's view field.

Inasmuch as the windowpane defogging device is configured to prevent the defogging device from being unnecessarily operated due to the generation of a fog in the windowpane portion which does not assist in securing the user's view field, it is possible to prevent unnecessary energy consumption and to remarkably improve the fuel efficiency of a motor vehicle.

BEST MODE FOR CARRYING OUT THE INVENTION

Certain preferred embodiments of a windowpane defogging device for a motor vehicle according to the present invention and a windowpane defogging method using the windowpane defogging device will now be described in detail with reference to the accompanying drawings. The components identical with those of the conventional device mentioned earlier will be designated by like reference symbols.

Referring first to FIGS. 3 to 6, the windowpane defogging device for a motor vehicle according to one embodiment of the present invention includes a relative humidity detecting unit 10 that detects the relative humidity of a windowpane G. The relative humidity detecting unit 10 includes a non-contact-type first temperature sensing unit 12 for sensing the temperature of a driver seat view field region X of the windowpane G and a non-contact-type second temperature sensing unit 14 for sensing the temperature of a passenger seat view field region Y of the windowpane G.

Figure 4:
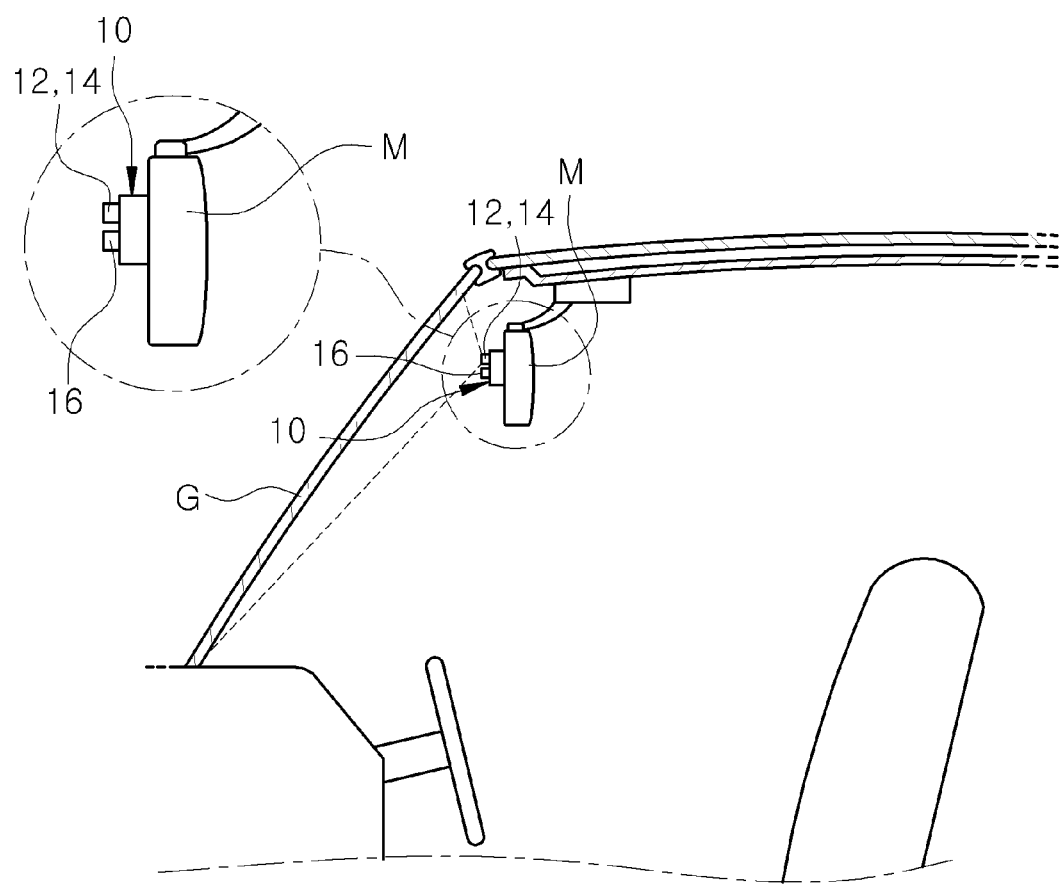
FIG. 4 is a side sectional view illustrating the installation state of a relative humidity detecting unit that makes up the present windowpane defogging device.
Figure 5:
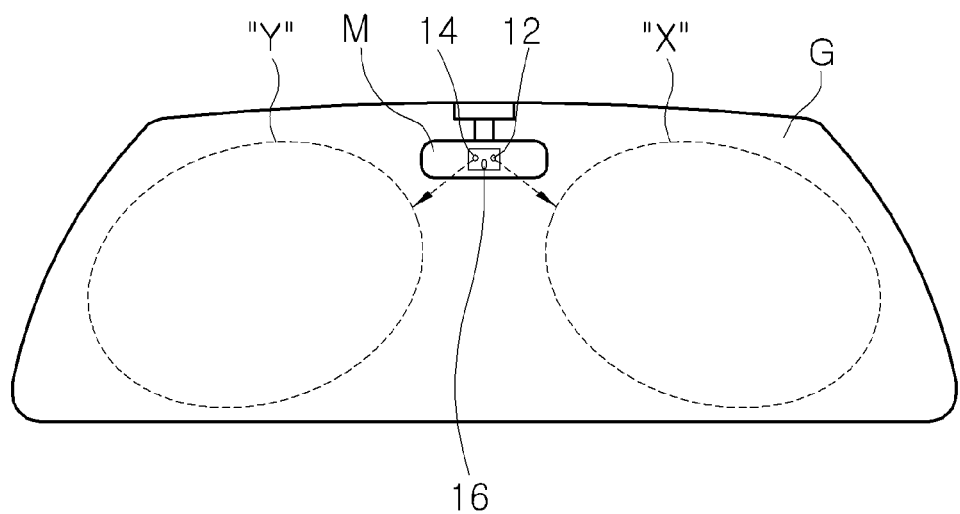
FIG. 5 is a front view of a motor vehicle illustrating the installation state of the relative humidity detecting unit that makes up the present windowpane defogging device, in which view there are indicated a driver seat view field region and a passenger seat view field region of a windowpane, the relative humidity of which can be detected by the relative humidity detecting unit.

As illustrated in FIGS. 4 and 5, the first and second temperature sensing units 12 and 14 are installed in a position spaced apart from the windowpane G, e.g., on a rear surface of a room mirror M existing within a vehicle room. Each of the first and second temperature sensing units 12 and 14 includes a thermopile infrared ray sensor (not shown) and an infrared ray temperature analyzing program. In particular, the thermopile infrared ray sensors of the first and second temperature sensing units 12 and 14 are installed to face toward the driver seat view field region X and the passenger seat view field region Y, respectively.

Figure 6:
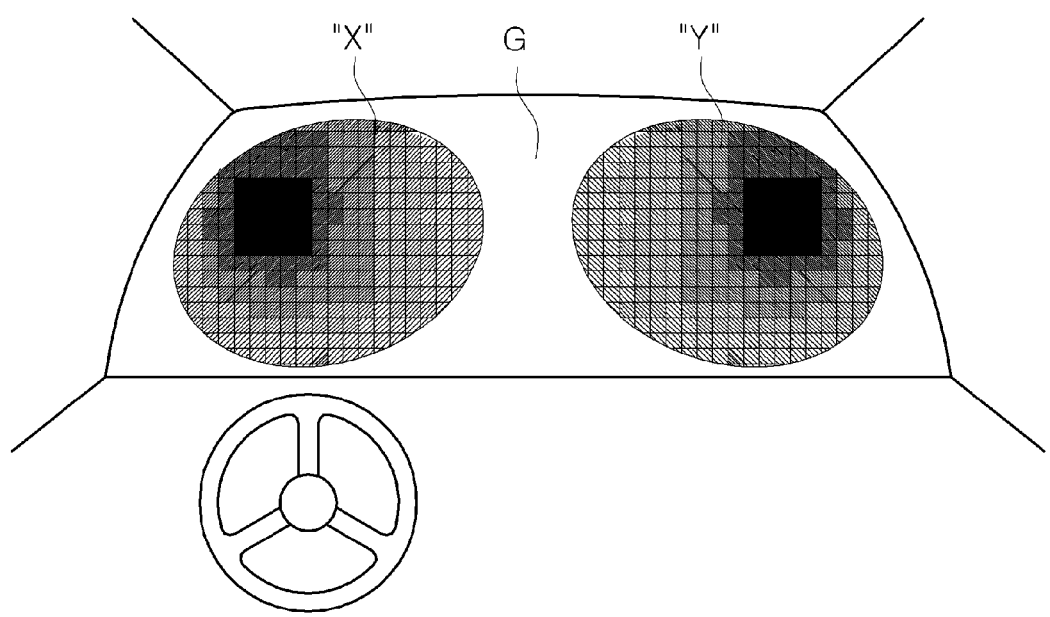
FIG. 6 is a view showing how the images of the driver seat view field region and the passenger seat view field region of the windowpane are picked up by the relative humidity detecting unit of the present windowpane defogging device to detect the temperature distributions of the driver seat view field region and the passenger seat view field region.

As shown in FIGS. 5 and 6, the first and second temperature sensing units 12 and 14 pick up the images of the driver seat view field region X and the passenger seat view field region Y through the use of the thermopile infrared ray sensors installed in a position spaced apart from the windowpane G and, then, detect a windowpane temperature distribution of the driver seat view field region X and a windowpane temperature distribution of the passenger seat view field region Y.

Using the infrared ray temperature analyzing program stored in advance, the temperature of a coldest section of the driver seat view field region X and the temperature of a coldest section of the passenger seat view field region Y are extracted from the windowpane temperature distribution of the driver seat view field region X and the windowpane temperature distribution of the passenger seat view field region Y.

In this regard, the thermopile infrared ray sensors of the first and second temperature sensing units 12 and 14 are installed to face toward the central sections of the driver seat view field region X and the passenger seat view field region Y.

Referring again to FIG. 3, the relative humidity detecting unit 10 further includes a humidity sensing unit 16 and a microcomputer 18. As shown in FIGS. 4 and 5, the humidity sensing unit 16 is installed in a position spaced apart from the windowpane G, e.g., on the rear surface of the room mirror M existing within the vehicle room. The humidity sensing unit 16 is provided with a humidity sensor (not shown). The humidity sensing unit 16 serves to sense the windowpane humidity in a position spaced apart from the windowpane G.

If the lowest temperature of the driver seat view field region X and the lowest temperature of the passenger seat view field region Y are respectively extracted from the first and second temperature sensing units 12 and 14, the microcomputer 18 calculates, using a calculation program stored in advance, the windowpane relative humidity of the driver seat view field region X and the windowpane relative humidity of the passenger seat view field region Y based on the lowest temperature of the driver seat view field region X, the lowest temperature of the passenger seat view field region Y and the humidity data of the windowpane G inputted from the humidity sensing unit 16.

Referring again to FIG. 3, the windowpane defogging device further includes a control unit 20 provided with a microprocessor. If the windowpane relative humidity of the driver seat view field region X and the windowpane relative humidity of the passenger seat view field region Y are inputted from the relative humidity detecting unit 10, the control unit 20 determines the generation or non-generation of a fog on the windowpane G based on the windowpane relative humidity of the driver seat view field region X and the windowpane relative humidity of the passenger seat view field region Y. The control unit 20 controls individual parts 3, 5, 7 and 8 of an air conditioning system based on the determination result.

More specifically, if at least one of the windowpane relative humidity of the driver seat view field region X and the windowpane relative humidity of the passenger seat view field region Y is equal to or higher than a predetermined reference humidity, the control unit 20 determines that a fog is generated on the windowpane G. Thus, the control unit 20 comes into a defogging mode.

In the defogging mode, the control unit 20 opens a defrost door 3 at a specified opening degree, converts an intake door 5 to an external air mode and operates a compressor 7 and a blower 8.

As a result, a fresh external air is cooled into a cold air while passing through an evaporator 7a. The cold air is discharged toward the windowpane through a defrost vent 3a. The cold air thus discharged can remove a fog adhering to the windowpane.

Figure 1:
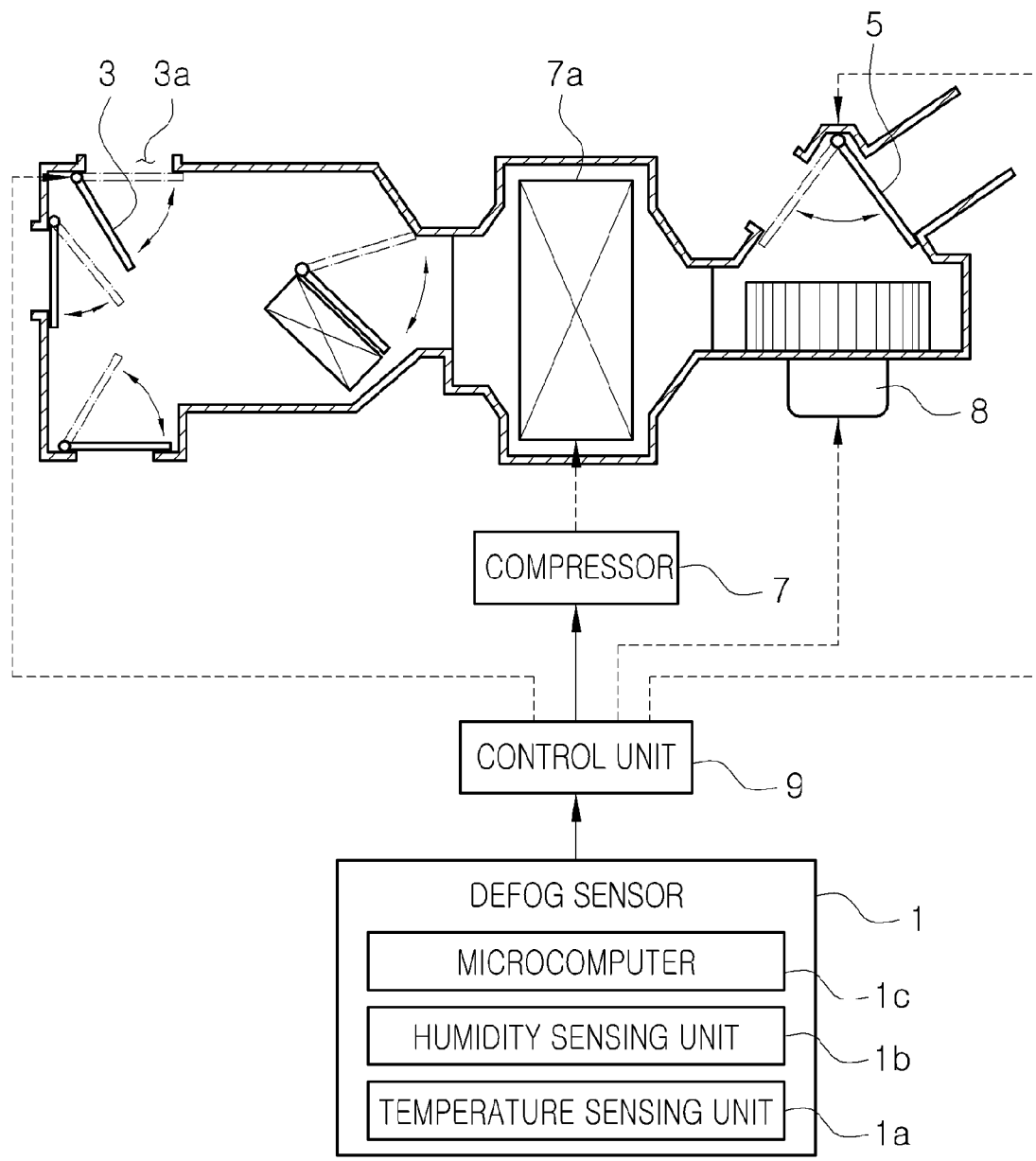
FIG. 1 is a view showing a conventional windowpane defogging device for a motor vehicle.
Figure 2:
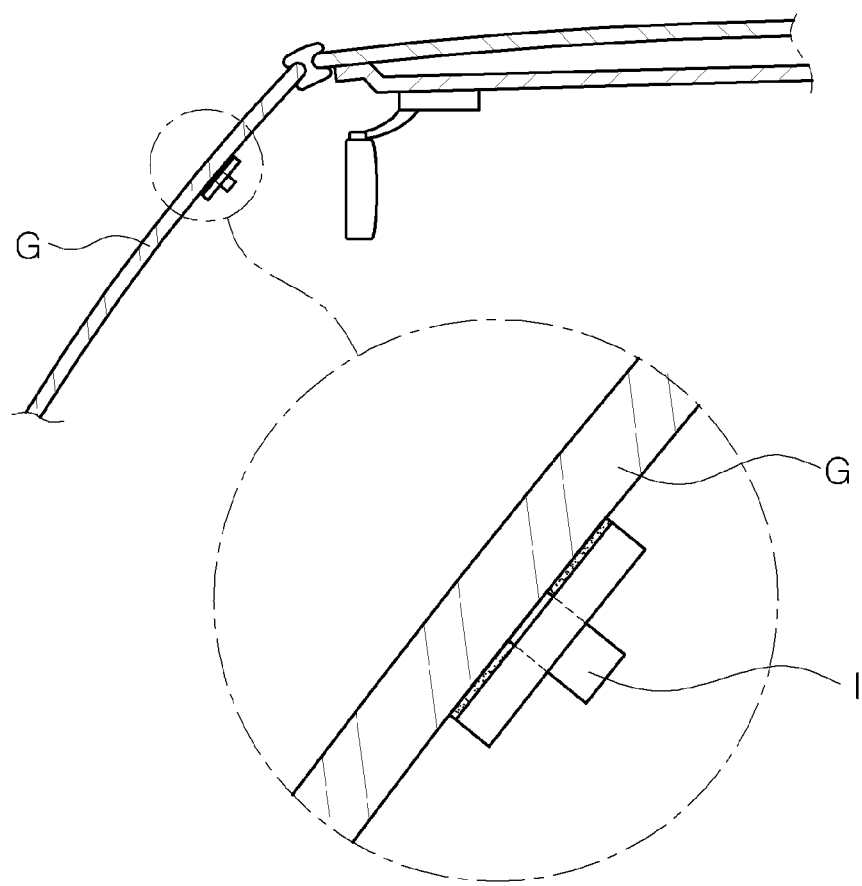
FIG. 2 is a view illustrating the installation state of a defog sensor that makes up the conventional windowpane defogging device.
Figure 3:
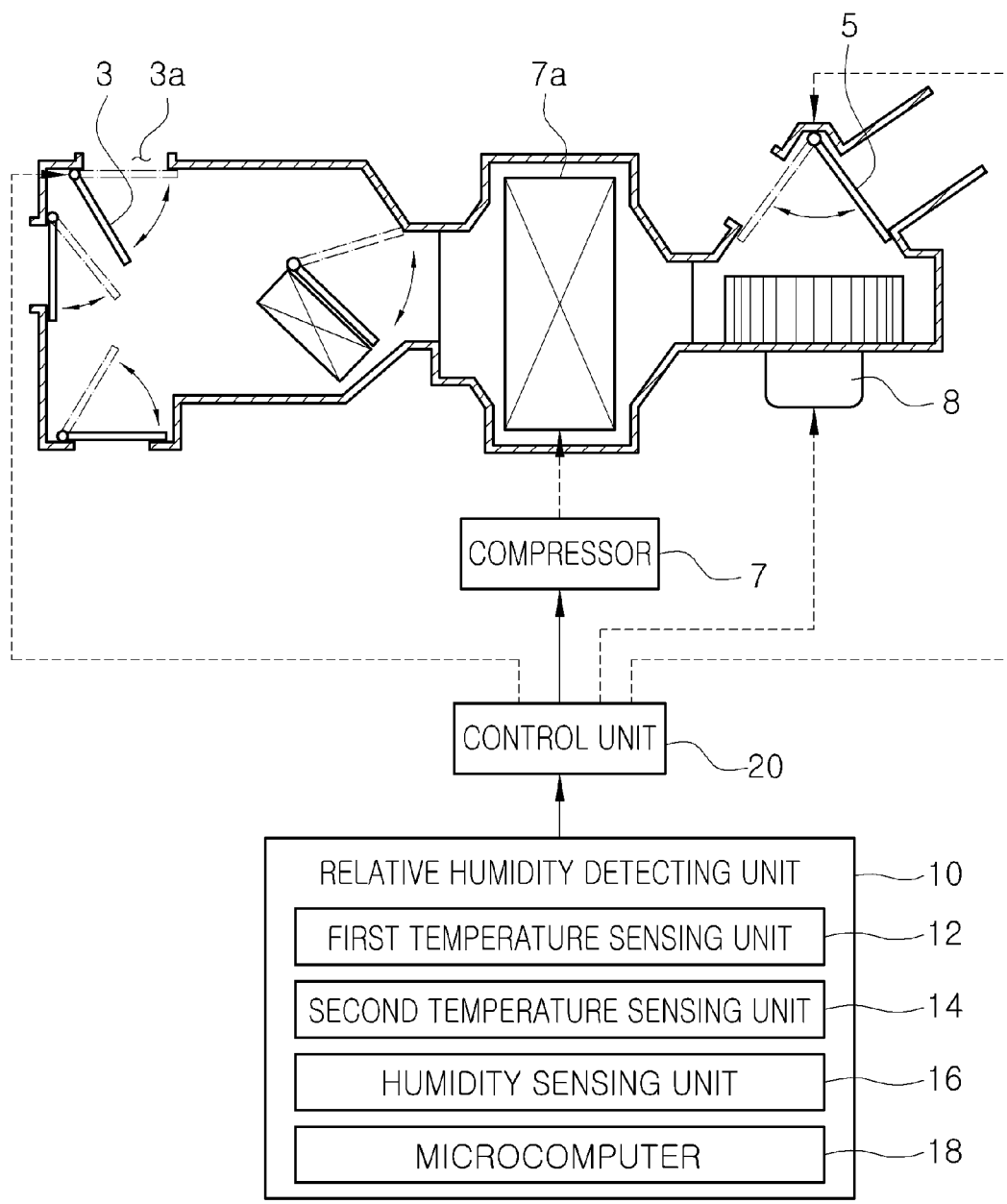
FIG. 3 is a view showing a windowpane defogging device for a motor vehicle according to one embodiment of the present invention.
Figure 7:
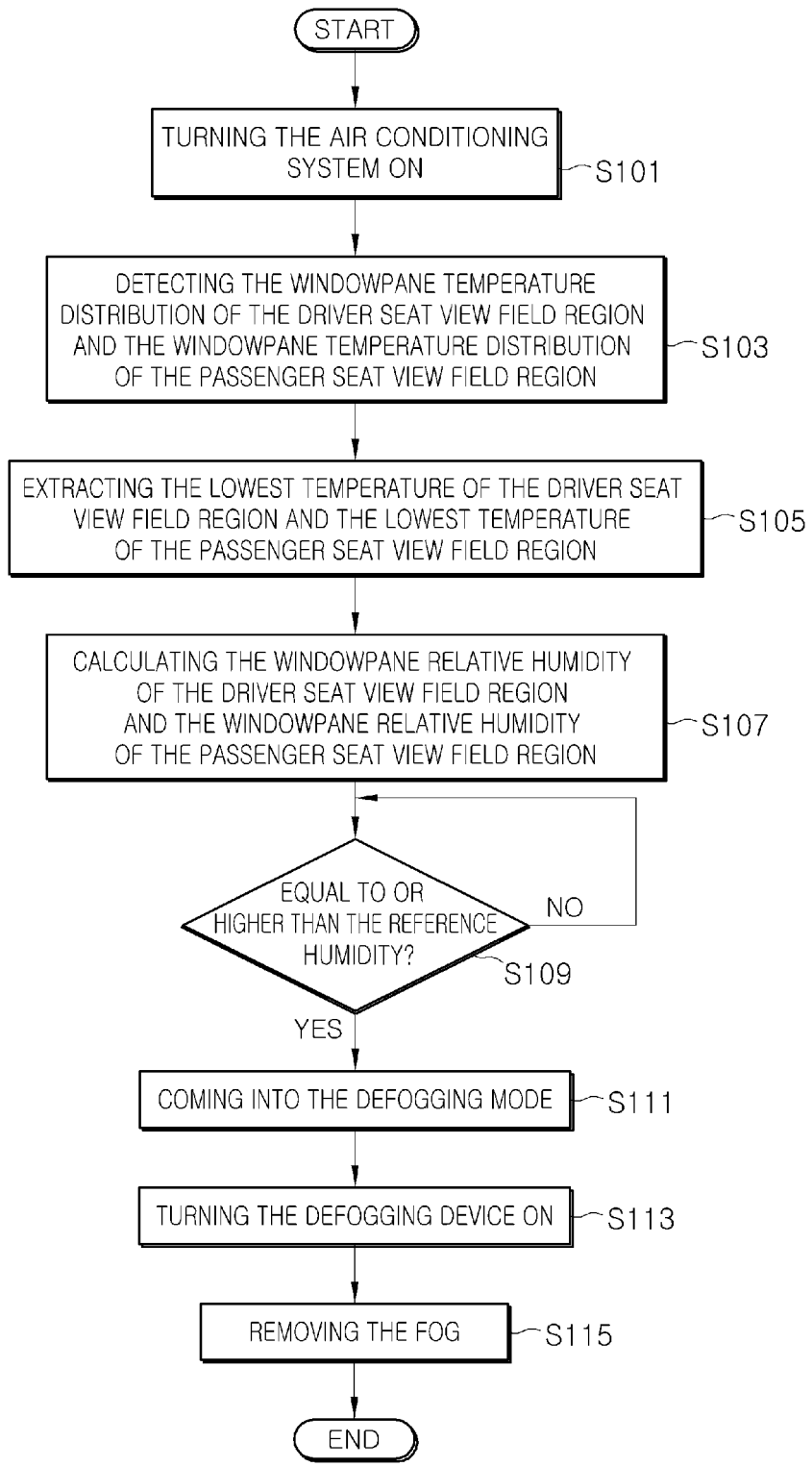
FIG. 7 is a flowchart illustrating a windowpane defogging method using the windowpane defogging device according to one embodiment of the present invention.

Next, a windowpane defogging method using the windowpane defogging device configured as above will be described with reference to FIGS. 3 and 7.

First, the air conditioning system is turned on (S101). In this state, the windowpane temperature distribution of the driver seat view field region X and the windowpane temperature distribution of the passenger seat view field region Y are detected by the first temperature sensing unit 12 and the second temperature sensing unit 14, respectively (S103).

Then, the lowest temperature of the driver seat view field region X is extracted from the windowpane temperature distribution of the driver seat view field region X and the lowest temperature of the passenger seat view field region Y is extracted from the windowpane temperature distribution of the passenger seat view field region Y (S105).

Upon finishing the extraction of the lowest temperature of the driver seat view field region X and the lowest temperature of the passenger seat view field region Y, the control unit 20 calculates the windowpane relative humidity of the driver seat view field region X and the windowpane relative humidity of the passenger seat view field region Y by processing the lowest temperature of the driver seat view field region X, the lowest temperature of the passenger seat view field region Y and the humidity data of the windowpane G inputted from the humidity sensing unit 16 (S107).

If the calculation of the windowpane relative humidity of the driver seat view field region X and the windowpane relative humidity of the passenger seat view field region Y is finished, the control unit 20 determines whether at least one of the windowpane relative humidity of the driver seat view field region X and the windowpane relative humidity of the passenger seat view field region Y is equal to or higher than the predetermined reference humidity (S109).

If the determination result reveals that at least one of the windowpane relative humidity of the driver seat view field region X and the windowpane relative humidity of the passenger seat view field region Y is equal to or higher than the predetermined reference humidity, the control unit 20 determines that a fog is generated on the windowpane G. Then, the control unit 20 comes into a defogging mode (S111).

In the defogging mode, the control unit 20 turns the windowpane defogging device on (S113). Then, a cold air is discharged toward the windowpane G, thereby removing the fog (S115).

According to the windowpane defogging device and the windowpane defogging method described above, the windowpane relative humidity is calculated using the temperature measured in the entire driver's view field region. It is therefore possible to accurately determine the generation or non-generation of a fog in the driver's view field region of the windowpane.

Since the windowpane defogging device is configured to accurately determine the generation or non-generation of a fog in the driver's view field region of the windowpane, it is possible to accurately control the operation or non-operation of the defogging device and the operation start time thereof.

Inasmuch as the windowpane defogging device is configured to accurately control the operation or non-operation of the defogging device and the operation start time thereof, it is possible to prevent the defogging device from being unnecessarily operated despite the non-generation of a fog in the driver's view field region.

Seeing that the windowpane defogging device is configured to prevent the defogging device from being unnecessarily operated despite the non-generation of a fog in the driver's view field region, it is possible to prevent unnecessary energy consumption and to improve the fuel efficiency of a motor vehicle.

Figure 8:
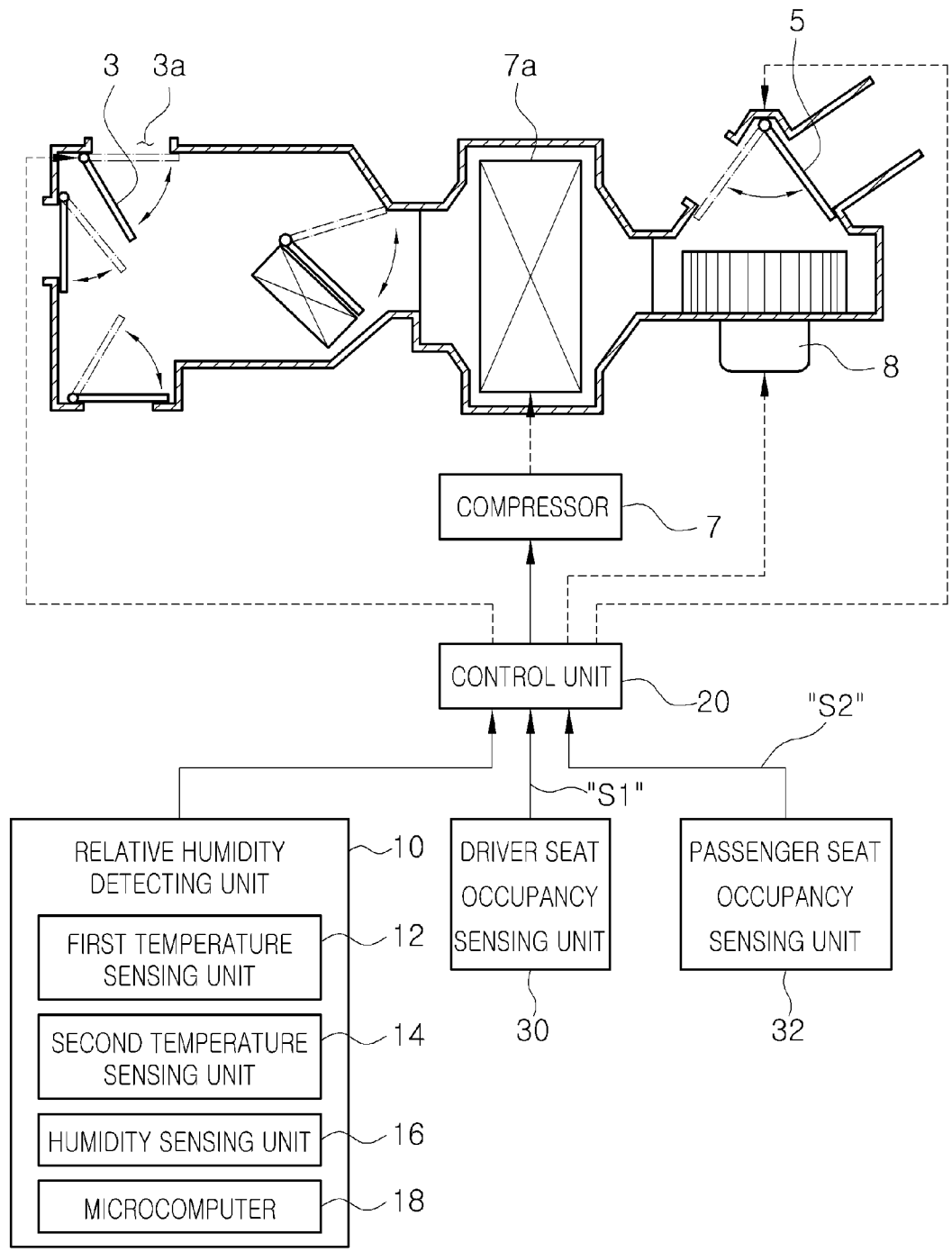
FIG. 8 is a view showing a windowpane defogging device according to another embodiment of the present invention.

Next, a windowpane defogging device according to another embodiment of the present invention will be described with reference to FIG. 8.

The windowpane defogging device according to another embodiment of the present invention further includes a driver seat occupancy sensing unit 30 and a passenger seat occupancy sensing unit 32.

The driver seat occupancy sensing unit 30 serves to detect the occupancy or non-occupancy of a driver seat. The driver seat occupancy sensing unit 30 includes a pressure sensor (not shown) installed in the driver seat. The pressure sensor senses the weight of the user who occupies the driver seat. Upon sensing the weight of the user, the pressure sensor determines that the driver seat is occupied by the user. In this case, the pressure sensor inputs a driver seat occupancy signal S1 to the control unit 20.

The passenger seat occupancy sensing unit 32 serves to detect the occupancy or non-occupancy of a passenger seat. The passenger seat occupancy sensing unit 32 includes a pressure sensor (not shown) installed in the passenger seat. The pressure sensor senses the weight of the user who occupies the passenger seat. Upon sensing the weight of the user, the pressure sensor determines that the passenger seat is occupied by the user. In this case, the pressure sensor inputs a passenger seat occupancy signal S2 to the control unit 20.

Alternatively, the driver seat occupancy sensing unit 30 and the passenger seat occupancy sensing unit 32 may be formed from a seat belt for the driver seat and a seat belt for the passenger seat, respectively.

When worn by the users who take the driver seat and the passenger seat, the seat belts are turned on to output a driver seat occupancy signal S1 and a passenger seat occupancy signal S2. In this way, the seat belts detect the occupancy or non-occupancy of the driver seat and the passenger seat.

If the driver seat occupancy signal S1 and the passenger seat occupancy signal S2 are inputted from the driver seat occupancy sensing unit 30 and the passenger seat occupancy sensing unit 32, the control unit 20 controls the windowpane defogging device in response to the signals S1 and S2 thus inputted.

If one or both of the driver seat occupancy signal S1 and the passenger seat occupancy signal S2 is inputted from the driver seat occupancy sensing unit 30 and the passenger seat occupancy sensing unit 32 in a state in which the windowpane relative humidity of the driver seat view field region X and the windowpane relative humidity of the passenger seat view field region Y are inputted from the relative humidity detecting unit 10, the generation or non-generation of a fog on the windowpane G is determined based on the windowpane relative humidity corresponding to the view field region associated with the inputted signal S1 or S2.

For example, if only the driver seat occupancy signal S1 is inputted from the driver seat occupancy sensing unit 30, the control unit 20 determines that a user has taken the driver seat.

Thus, the generation or non-generation of a fog on the windowpane G is determined based on only the windowpane relative humidity of the driver seat view field region X corresponding to the driver seat occupied by the user, while excluding the windowpane relative humidity of the passenger seat view field region Y corresponding to the passenger seat not occupied by the user.

In contrast, if only the passenger seat occupancy signal S2 is inputted from the passenger seat occupancy sensing unit 32, the control unit 20 determines that a user has taken the passenger seat.

Thus, the generation or non-generation of a fog on the windowpane G is determined based on only the windowpane relative humidity of the passenger seat view field region Y corresponding to the passenger seat occupied by the user, while excluding the windowpane relative humidity of the driver seat view field region X corresponding to the driver seat not occupied by the user.

If both the driver seat occupancy signal S1 and the passenger seat occupancy signal S2 are inputted from the driver seat occupancy sensing unit 30 and the passenger seat occupancy sensing unit 32, the control unit 20 determines that users have taken both the driver seat and the passenger seat.

Thus, the generation or non-generation of a fog on the windowpane G is determined based on both the windowpane relative humidity of the driver seat view field region X and the windowpane relative humidity of the passenger seat view field region Y inputted from the relative humidity detecting unit 10.

The reason for employing the aforementioned configuration is to determine the generation or non-generation of a fog on the windowpane G based on only the windowpane relative humidity of the view field region corresponding to the seat occupied by the user.

The reason for determining the generation or non-generation of a fog on the windowpane G based on only the windowpane relative humidity of the view field region corresponding to the seat occupied by the user is that the windowpane portion corresponding to the seat occupied by the user assists in securing the user's view field. By doing so, the windowpane defogging device is operated only when a fog is generated in the windowpane portion which assists in securing the user's view field.

If both the driver seat occupancy signal S1 and the passenger seat occupancy signal S2 are not inputted from the driver seat occupancy sensing unit 30 and the passenger seat occupancy sensing unit 32, the control unit 20 recognizes that users have not taken the driver seat and the passenger seat. Thus, the control unit 20 does not determine the generation or non-generation of a fog on the windowpane G and, consequently, stops the operation of the windowpane defogging device.

Figure 9:
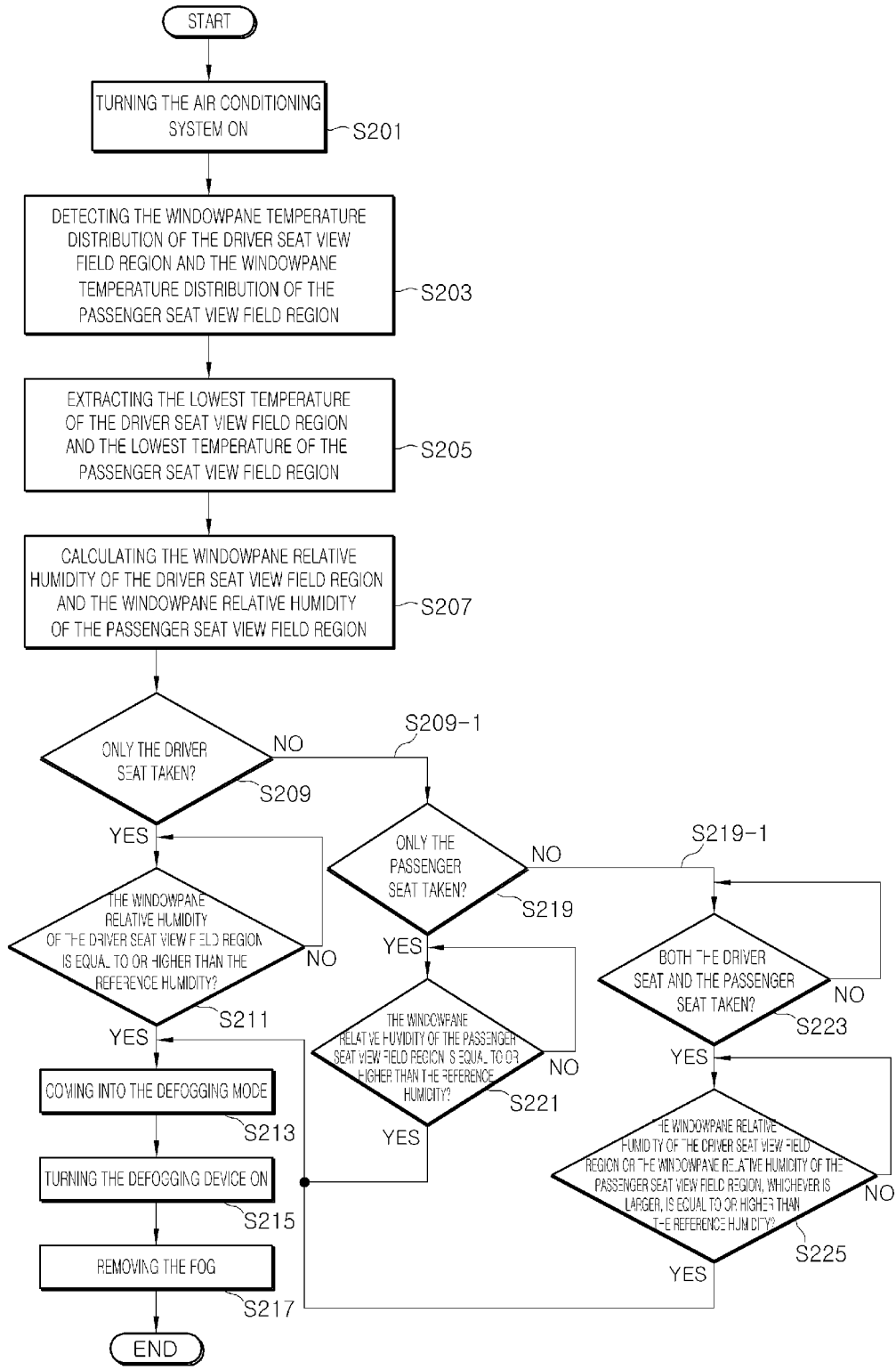
FIG. 9 is a flowchart illustrating a windowpane defogging method using the windowpane defogging device according to another embodiment of the present invention.

Next, a windowpane defogging method using the windowpane defogging device according to another embodiment of the present invention will be described with reference to FIGS. 8 and 9.

First, the air conditioning system is turned on (S201). In this state, the windowpane temperature distribution of the driver seat view field region X and the windowpane temperature distribution of the passenger seat view field region Y are detected by the first temperature sensing unit 12 and the second temperature sensing unit 14, respectively (S203).

Then, the lowest temperature of the driver seat view field region X is extracted from the windowpane temperature distribution of the driver seat view field region X and the lowest temperature of the passenger seat view field region Y is extracted from the windowpane temperature distribution of the passenger seat view field region Y (S205).

Upon finishing the extraction of the lowest temperature of the driver seat view field region X and the lowest temperature of the passenger seat view field region Y, the control unit 20 calculates the windowpane relative humidity of the driver seat view field region X and the windowpane relative humidity of the passenger seat view field region Y by processing the lowest temperature of the driver seat view field region X, the lowest temperature of the passenger seat view field region Y and the humidity data of the windowpane G inputted from the humidity sensing unit 16 (S207).

If the calculation of the windowpane relative humidity of the driver seat view field region X and the windowpane relative humidity of the passenger seat view field region Y is finished, the control unit 20 determines whether only the driver seat is taken by a user (S209).

If the determination result reveals that only the driver seat is taken by a user, the control unit 20 determines whether the windowpane relative humidity of the driver seat view field region X is equal to or higher than a predetermined reference humidity (S211).

If the windowpane relative humidity of the driver seat view field region X is equal to or higher than the reference humidity, the control unit 20 determines that a fog is generated in the driver seat view field region X of the windowpane G. Thus, the control unit 20 comes into a defogging mode (S213).

In the defogging mode, the control unit 20 turns the windowpane defogging device on (S215). Then, a cold air is discharged toward the windowpane G, thereby removing the fog (S217).

If it is determined in step S209 that only the driver seat is not taken by a user (S209-1), the control unit 20 determines whether only the passenger seat is taken by a user (S219).

If the determination result reveals that only the passenger seat is taken by a user, the control unit 20 determines whether the windowpane relative humidity of the passenger seat view field region Y is equal to or higher than a predetermined reference humidity (S221).

As a result of the determination, if the windowpane relative humidity of the passenger seat view field region Y is equal to or higher than the reference humidity, the control unit 20 determines that a fog is generated in the passenger seat view field region Y of the windowpane G. Thus, the control unit 20 comes into a defogging mode (S213).

In the defogging mode, the control unit 20 turns the windowpane defogging device on (S215). Then, a cold air is discharged toward the windowpane G, thereby removing the fog (S217).

If it is determined in step S219 that only the passenger seat is not taken by a user (S219-1), the control unit 20 determines whether both the driver seat and the passenger seat are taken by users (S223).

If the determination result reveals that both the driver seat and the passenger seat are taken by users, the control unit 20 determines whether the windowpane relative humidity of the driver seat view field region X or the windowpane relative humidity of the passenger seat view field region Y, whichever is larger, is equal to or higher than a predetermined reference humidity (S225).

As a result of the determination, if the windowpane relative humidity of the driver seat view field region X or the windowpane relative humidity of the passenger seat view field region Y, whichever is larger, is equal to or higher than the reference humidity, the control unit 20 determines that fogs are generated in the driver seat view field region X and the passenger seat view field region Y of the windowpane G. Thus, the control unit 20 comes into a defogging mode (S213).

In the defogging mode, the control unit 20 turns the windowpane defogging device on (S215). Then, a cold air is discharged toward the windowpane G, thereby removing the fog (S217).

As described above, the windowpane defogging device according to another embodiment of the present invention is configured to determine the generation or non-generation of a fog on the windowpane based on only the windowpane relative humidity of the view field region corresponding to the driver seat or the passenger seat taken by the user. It is therefore possible to accurately control the operation or non-operation of the defogging device by relying on only the relative humidity of the windowpane portion which assists in securing the user's view field.

Since the windowpane defogging device is configured to accurately control the operation or non-operation of the defogging device by relying on only the relative humidity of the windowpane portion which assists in securing the user's view field, it is possible to prevent the defogging device from being unnecessarily operated due to the generation of a fog in the windowpane portion which does not assist in securing the user's view field.

Inasmuch as the windowpane defogging device is configured to prevent the defogging device from being unnecessarily operated due to the generation of a fog in the windowpane portion which does not assist in securing the user's view field, it is possible to prevent unnecessary energy consumption and to remarkably improve the fuel efficiency of a motor vehicle.

While certain preferred embodiments of the present invention have been described above, the present invention is not limited to these embodiments. It will be apparent to those skilled in the relevant art that various modifications may be made without departing from the scope of the invention defined in the claims.

What is claimed is:

1. A windowpane defogging device for a motor vehicle which, upon generation of a fog on a windowpane, comes into a defogging mode to remove the fog generated on the windowpane, comprising:

a relative humidity detecting unit configured to detect a windowpane relative humidity of a driver seat view field region of the windowpane and a windowpane relative humidity of a passenger seat view field region of the windowpane, the driver seat view field region comprising a left portion of the windowpane before a driver seat, the passenger seat view field region comprising a right portion of the windowpane before a front passenger seat;

a driver seat occupancy sensor and a front passenger seat occupancy sensor to detect occupancy or non-occupancy of the driver seat and the front passenger seat, respectively; and a control unit configured to enter the defogging mode when at least one of the windowpane relative humidity of the driver seat view field region and the windowpane relative humidity of the passenger seat view field region inputted from the relative humidity detecting unit is greater than a predetermined reference humidity; and wherein the control unit, in the defogging mode, causes an air condition system to discharge a cold air toward the windowpane;

wherein the relative humidity detecting unit further comprises:

a first temperature sensing unit configured to sense a windowpane temperature of the driver seat view field region;

a second temperature sensing unit configured to sense a windowpane temperature of the passenger seat view field region;

a humidity sensing unit configured to sense a humidity of the windowpane; and a microcomputer configured to calculate the windowpane relative humidity of the driver seat view field region and the windowpane relative humidity of the passenger seat view field region by processing the windowpane temperature of the driver seat view field region, the windowpane temperature of the passenger seat view field region and the humidity of the windowpane using a calculation program stored in advance;

wherein each of the first temperature sensing unit and the second temperature sensing unit has a non-contact-type structure;

wherein the first temperature sensing unit comprises a thermopile infrared ray sensor installed in a position spaced apart from the windowpane and configured to detect a windowpane temperature distribution of the driver seat view field region by picking up an image of a windowpane portion corresponding to the driver seat view field region and an infrared ray temperature analyzing program configured to extract a lowest temperature of the driver seat view field region from the windowpane temperature distribution of the driver seat view field region;

wherein the second temperature sensing unit comprises a thermopile infrared ray sensor installed in a position spaced apart from the windowpane and configured to detect a windowpane temperature distribution of the passenger seat view field region by picking up an image of a windowpane portion corresponding to the passenger seat view field region and an infrared ray temperature analyzing program configured to extract a lowest temperature of the passenger seat view field region from the windowpane temperature distribution of the passenger seat view field region;

wherein the microcomputer is configured to calculate the windowpane relative humidity of the driver seat view field region and the windowpane relative humidity of the passenger seat view field region based on the lowest temperature of the driver seat view field region and the lowest temperature of the passenger seat view field region; and wherein, when only one of the driver seat and the front passenger seat is detected as taken by a user, the control unit is configured to determine the generation or non-generation of the fog on the windowpane based on only the windowpane relative humidity of the driver seat view field region or the passenger seat view field region corresponding to the driver seat or the front passenger seat taken by the user, while excluding the windowpane relative humidity of the driver seat view field region or the passenger seat view field region corresponding to the driver seat or the front passenger seat not taken by the user.

2. The windowpane defogging device of claim 1, wherein, when both the driver seat and the front passenger seat are detected as taken by users, the control unit is configured to determine the generation or non-generation of the fog on the windowpane based on the larger of the windowpane relative humidity of the driver seat view field region and the windowpane relative humidity of the passenger seat view field region.

3. The windowpane defogging device of claim 1, wherein the thermopile infrared ray sensor of the first temperature sensing unit is installed to face toward a central section of the driver seat view field region, and the thermopile infrared ray sensor of the second temperature sensing unit is installed to face toward a central section of the passenger seat view field region.

4. The windowpane defogging device of claim 3, wherein the first temperature sensing unit, the second temperature sensing unit and the humidity sensing unit of the relative humidity detecting unit are fixedly secured to a room mirror spaced apart from the windowpane and existing within a vehicle room.

5. A windowpane defogging method which, upon generation of a fog on a windowpane, comes into a defogging mode to remove the fog generated on the windowpane, comprising:

a) a step of detecting, by a first temperature sensor, a second temperature sensor and a humidity sensor of a relative humidity detector, a windowpane temperature of a driver seat view field region of the windowpane, a windowpane temperature of a passenger seat view field region of the windowpane and a humidity of the windowpane, respectively, the driver seat view field region comprising a left portion of the windowpane before a driver seat, the passenger seat view field region comprising a right portion of the windowpane before a front passenger seat;

b) a step of calculating, by a microcomputer of the relative humidity detector, a windowpane relative humidity of the driver seat view field region and a windowpane relative humidity of the passenger seat view field region, respectively, by processing the windowpane temperature of the driver seat view field region, the windowpane temperature of the passenger seat view field region and the humidity of the windowpane;

c) a step of determining, by a controller, whether at least one of the windowpane relative humidity of the driver seat view field region and the windowpane relative humidity of the passenger seat view field region is equal to or higher than a predetermined reference humidity; and d) a step of, when at least one of the windowpane relative humidity of the driver seat view field region and the windowpane relative humidity of the passenger seat view field region is equal to or higher than the predetermined reference humidity, entering, by the controller, the defogging mode to discharge a cold air toward the windowpane; and wherein a temperature of a coldest section of the driver seat view field region and a temperature of a coldest section of the passenger seat view field region are detected in the step a);

wherein the step a) comprises:
   a-1) picking up an image of a windowpane portion corresponding to the driver seat view field region and an image of a windowpane portion corresponding to the passenger seat view field region in a position spaced apart from the windowpane;
   a-2) detecting a windowpane temperature distribution of the driver seat view field region and a windowpane temperature distribution of the passenger seat view field region using the image of the windowpane portion corresponding to the driver seat view field region and the image of the windowpane portion corresponding to the passenger seat view field region; and
   a-3) extracting the temperature of the coldest section of the driver seat view field region and the temperature of the coldest section of the passenger seat view field region from the windowpane temperature distribution of the driver seat view field region and the windowpane temperature distribution of the passenger seat view field region;

wherein the step c) comprises:
   c-1) a step of determining, by a driver seat occupancy sensor and a front passenger seat occupancy sensor, whether the driver seat or the front passenger seat is taken by a user; and
   c-2) a step of determining, by the controller, whether the windowpane relative humidity of the driver seat view field region or the passenger seat view field region corresponding to the driver seat or the front passenger seat taken by the user is equal to or higher than the predetermined reference humidity, while excluding the windowpane relative humidity of the driver seat view field region or the passenger seat view field region corresponding to the driver seat or the passenger seat not taken by the user.

* * * * *